United States Patent

Hayashi et al.

[11] 3,719,592
[45] March 6, 1973

[54] FILTRATION PROCESS FOR CLARIFICATION

[75] Inventors: Yoshiro Hayashi; Ayatoshi Obara, both of Tokyo, Japan

[73] Assignee: Erbara Infilco Kabushiki Kaisha, Tokyo, Japan

[22] Filed: Sept. 17, 1971

[21] Appl. No.: 181,442

Related U.S. Application Data

[63] Continuation-in-part of Ser. No. 2,705, Jan. 14, 1970, abandoned.

[30] Foreign Application Priority Data

Jan. 17, 1969 Japan .................................. 44/3265

[52] U.S. Cl. ........................ 210/53, 210/75, 210/80
[51] Int. Cl. ...........................................B01d 21/01
[58] Field of Search .......................... 210/42, 52–54, 210/75, 80

[56] References Cited

UNITED STATES PATENTS

| | | |
|---|---|---|
| 3,131,144 | 4/1964 | Nagan .................................. 210/54 |
| 3,171,803 | 2/1965 | Rice et al. ........................... 210/53 X |
| 3,171,804 | 2/1965 | Rice et al. ........................... 210/54 X |
| 3,478,880 | 11/1969 | Harris ................................. 210/80 |

Primary Examiner—Reuben Friedman
Assistant Examiner—Thomas G. Wyse
Attorney—Alex Friedman et al.

[57] ABSTRACT

The present invention is a filtration process for performing rapid filtration by adding an inorganic coagulant to a suspension, consisting of adding a coagulant in the amount less than that with which formation of flocs is recognized to a suspension having the turbidity of raw water, keeping the time, as measured from the point of adding the coagulant to the suspension to the supplying of said suspension to the filtration tank, within a few minutes, treating said suspension at a filtration rate higher than the usual level, and varying the added amount of the coagulant or the filtration rate or both of them until the filtered water becomes stable after the beginning of filtration in the above filtration process.

2 Claims, 3 Drawing Figures

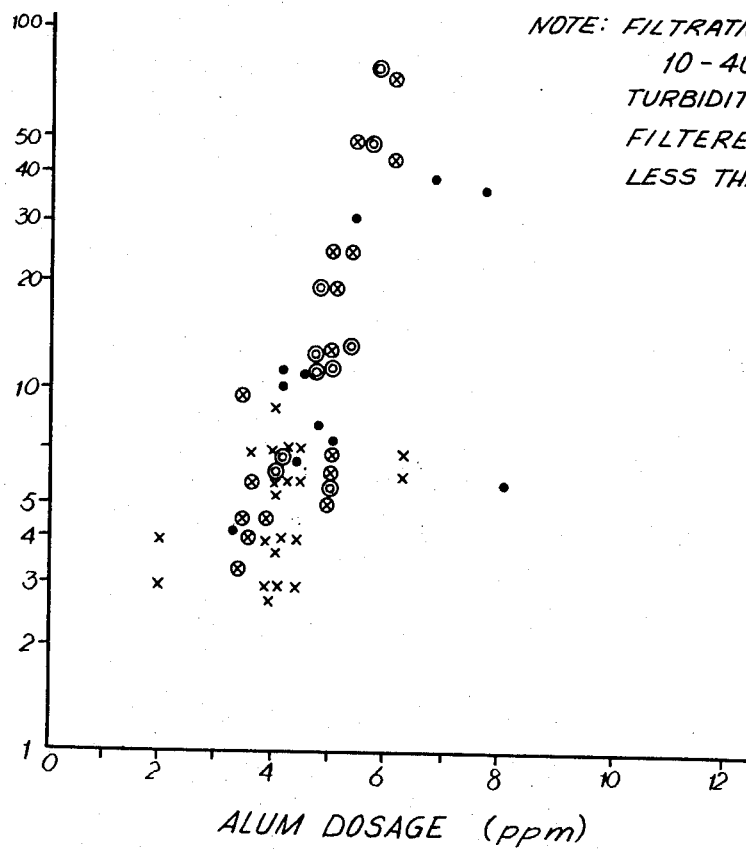

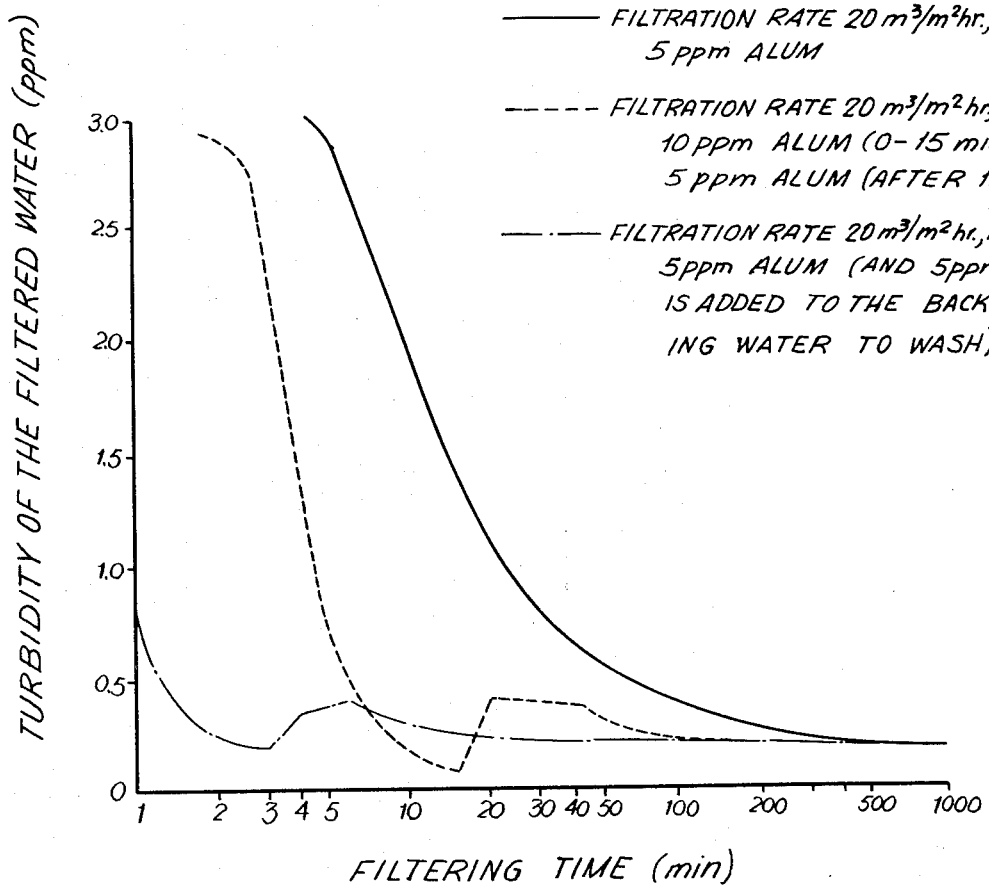

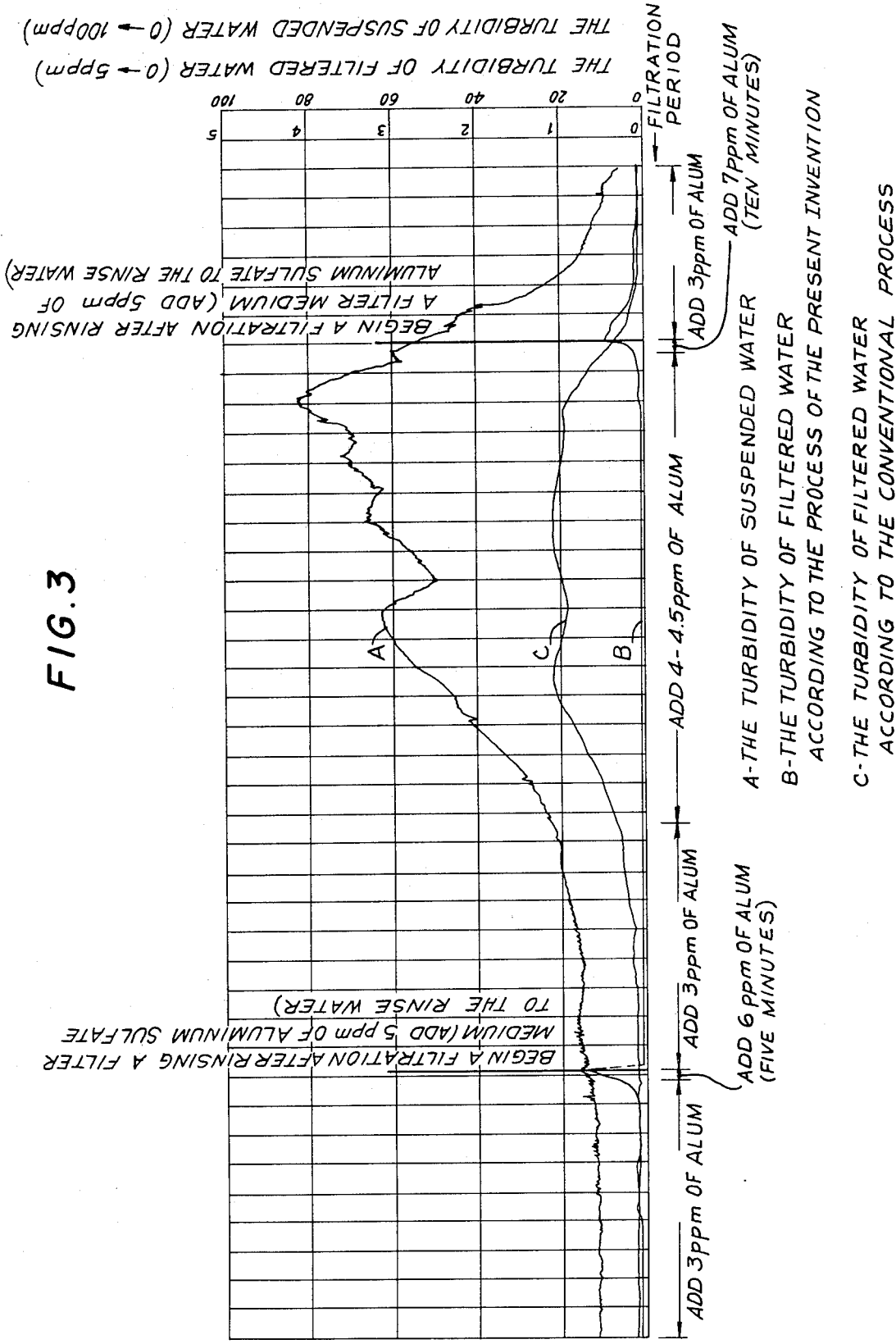

FILTRATION PROCESS FOR CLARIFICATION

CROSS REFERENCE TO RELATED APPLICATION

This is a continuation-in-part application of application Ser. No. 2,705, filed Jan. 14, 1970 now abandoned.

BACKGROUND OF THE INVENTION

In an ordinary rapid filtration process, a sufficient amount of a coagulant is added, and after coagulation and sedimentation the liquid is supplied to a rapid filter unit to be filtered. As the result of the sedimentation treatment greatly influences the filtering efficiency, it was generally believed that no further improvement in the quality of the coagulated and settled-liquid was possible in order to increase the filtering efficiency. The mechanism of such a filtration process is considered to be sub-stantially dependent on sieving in the filter beds and sedimentation by gravity.

A filtration process named a microfloc process was recently reported as compared with the above-described process consisting of sedimentation. According to this process a sedimentation basin is omitted except when the liquid has a high turbidity, and the raw water is directly supplied to a filtration basin after adding a coagulant: that is, a small amount of a coagulant is added to the raw water before passing the raw water through a filter of a multilayer type, and then a small amount of a high polymer coagulant is further added as a secondary coagulant just prior to supplying the raw water to a filtration basin. This idea is shown in the specifications of U.S. Pat. Nos. 3,067,133 and 3,171,801, and presents a process wherein some fine flocs are produced by adding a coagulant before introducing the liquid into a filtration basin, while just before supplying the liquid to the filtration basin, a high polymer coagulant is further added to promote formation of flocs in the basin to make tough flocs.

SUMMARY OF THE INVENTION

The present invention is a filtration process for clarification, characterized by the addition of an inorganic coagulant, in an amount less than that with which formation of flocs is recognized by a coagulation test, to a suspended water having the turbidity of raw water lower than 500 ppm, maintaining the contacting time, as measured from the time that said coagulant is added to the suspension to the time that said suspension is supplied to a filter tank to within a few minutes, filtering the liquid at a filtration rate higher than 5 m³/m² hr. at all times during the process and during filtering, increasing the amount of the coagulant added by a small amount during the period after the beginning of filtration until the filtered water becomes stable, or increasing the filtration rate, or employing both of the two last-mentioned steps.

The present invention is a filtration process for rapidly clarifying a liquid by removing suspended materials in the liquid.

The purpose of the present invention is to make rapid and continuous filtration over a long period of time possible without deterioration of the quality of the filtered water by utilizing a filtering mechanism different from the above-described conventional ones, wherein a minimum amount of coagulant is utilized at its maximum capability.

Another purpose of this invention is to present an economical filtration process by greatly reducing the installing area of a filter tank necessary to filtration, thereby saving the costs of equipment, operation and maintenance.

The present invention is particularly effective in treatment of raw water having a turbidity lower than 500 ppm, and has as its principal characteristics, that the coagulant should be added near a filter tank so as to be able to reach it within a few minutes and so that the formation of flocs cannot be recognized optically.

According to the present invention, filtered clear water can be obtained rapidly over a long period of time using a small amount of a coagulant, and without secondary coagulation by a high polymer coagulant and pretreatment such as coagulation and sedimentation, by a process wherein a coagulant of an amount less than that with which formation of flocs is recognized optically in a coagulation test is added to the liquid, and the adding amount of the coagulant is a little increased for 20-30 minutes after beginning of filtration and then decreased to a normal level, or the filtration rate is promoted at beginning of filtration and after 20-30 minutes when the filtered water is stabilized it is decreased, or a small amount of the coagulant is added to the back-washing water and filtration is immediately started.

In accordance with the present invention, the installing area of the filter tank may become ½ – ⅛ of the conventional one; so that the costs of equipment and maintenance can be greatly reduced. The water loss can be reduced and the ability of the added coagulant can be completely utilized without any waste; thus the raw water can be treated without deteriorating the quality of the filtered water.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 shows the relation between the turbidity of the raw water and the adding amount of a coagulant;

FIG. 2 is a diagram showing the relation between the filtering time and the turbidity of the filtered water with various filtration rates; and FIG. 3 is a diagram showing the relation of filtration period to the turbidity of filtered water and suspended water in another example of the method according to the invention.

DETAILED DESCRIPTION OF THE PREFERRED EMBODIMENTS

FIG. 1 represents the relation between the turbidity of the raw water and the added amount of a coagulant (aluminum sulfate $Al_3(SO_4)_3 \cdot 18H_2O$) according to the present invention. The raw water was a lake water having pH 6.8-7.3, M-alkalinity 35-42 ppm, turbidity 4-100 ppm, and color 5-100 ppm, and the amount of the coagulant added was what was required to get a filtered water having a turbidity less than 0.5 ppm. The amount of aluminum sulfate added was determined with a filtration rate of 10–40 m$^3$/m$^2$hr. in winter, spring, summer and fall; the contacting time from adding aluminum sulfate to introducing the water into a filter was 40 seconds at a filtration rate of 10 m$^3$/m$^2$hr., 20 seconds at 20 m$^3$/m$^2$hr., 13 seconds at 30 m$^3$/m$^2$hr., and 10 seconds at 40 m$^3$/m$^2$hr. As clearly seen in this figure, in the range up to 100 ppm of the turbidity of the raw water, the turbidity has no correlative relation with the amount of aluminum sulfate added. A clarified water can be obtained by adding Al$_2$(SO$_4$)$_3$·18H$_2$O in amounts as little as 5–7 ppm. In this invention the influence of the water temperature can be neglected, and the influence of the filtration rate is hardly recognized. A liquid can be treated with only one kind of coagulant in a very small amount. When adding 5–7 ppm of Al$_2$(SO$_4$)$_3$·18H$_2$O, flocs cannot be recognized optically; the amount required to recognize flocs is higher than 12 ppm of Al$_2$(SO$_4$)$_3$·18H$_2$O.

According to a conventional coagulation sedimentation filtering process, 12–30 ppm of aluminum sulfate is required for formation of flocs. When using 30 ppm of aluminum sulfate, flocs are hardly formed due to decrease of alkalinity, so an alkaline agent should be added. According to the present invention, however, as the amount of the aluminum sulfate added is so small, addition of a high polymer coagulant employed in a microfloc process is not necessitated, and clarification can be performed by adding a very small amount of aluminum sulfate.

FIG. 1 shows the data obtained with the turbidity of the raw water up to 100 ppm, but the present invention is also sufficiently effective where the raw water has a higher turbidity.

If the turbidity of raw water is 300–500 ppm, filtered water having a turbidity less than 1 ppm may be obtained by adding 15 ppm of aluminum sulfate where the turbidity of the raw water is 300 ppm, and 20 ppm of aluminum sulfate where said turbidity is 500 ppm.

When treating such high turbidity water with a usual coagulation sedimentation filtration process, it is necessary to add 50–60 ppm aluminum sulfate and several scores of ppm of an alkaline agent, but in the present invention, clarification can be carried out by adding only a small amount of aluminum sulfate.

When adding a small amount of a coagulant from the beginning of filtration as described above, the relation between clarification and the filtering time seen in FIG. 2 is obtained. Scores of minutes or 1 hour after initiation of filtration, filtered water having about 1 ppm turbidity is obtained.

Further precise experiments have been carried out to promote reduction of the turbidity at the beginning of filtration to finish such filtration more rapidly. The resulting data are partially shown in the following table. Said table shows the effects of the amount of aluminum sulfate added and the filtration rate on clarification of a liquid having a turbidity of 15 ppm. The values in the table are the time (minutes) required to get the filtered water having a turbidity of 0.5 ppm from beginning of filtration.

| Filtration rate | Adding amount of aluminum sulfate | 5 ppm | 7 ppm | 10 ppm |
| --- | --- | --- | --- | --- |
| 10 m$^3$/m$^2$ hr. | | 70 | 16.5 | 10.5 |
| 20 m$^3$/m$^2$ hr. | | 70 | 10.5 | 6 |
| 30 m$^3$/m$^2$ hr. | | 18 | 7.5 | 5 |
| 40 m$^3$/m$^2$ hr. | | 18 | 6 | 2.5 |

The filter media used in each experiment was sand of 0.4–0.9 mm$\phi$ particle diameter and anthracite piled above said sand and having a 1.0–1.5 mm$\phi$ particle diameter. Said sand and anthracite were packed in a filter of 0.8 m$\phi$ diameter to bed depths of 0.6 m and 0.3 m, respectively, the total bed depth being 0.9 m.

As seen in the above table, clear water can be produced just after initiation of filtration by adding 7–10 ppm of aluminum sulfate at the beginning of filtering and after 20–30 minutes, decreasing the aluminum sulfate to 5 ppm. Clear water can be also obtained in a short time by increasing the filtration rate temporarily at the beginning of filtration and then reducing the rate to the objective filtration rate. As seen in FIG. 2, though not shown in the table, clear water can be obtained in a short time by adding about 5 ppm of aluminum sulfate to the water which washes the filtering materials to regenerate same, and after sufficient washing, starting filtration. An economical filtering treatment with a lower water loss can be presented by combining the above-described methods and the method of adding a very small amount of a coagulant, with which formation of flocs cannot be recognized optically, at the point in the liquid path from which the liquid can reach the filter within a few minutes.

A further example of the method according to the invention is depicted in FIG. 3. Said figure shows the results of experiments performed utilizing the process according to the invention comparing filtration period against the turbidity of filtered water and the turbidity of suspended water. In this example, the turbidity of the suspended water changed from 10 ppm to 84 ppm. In said example, the filtration rate was 37.5 m$^3$/m$^2$ hr. As shown in FIG. 3, suspended water with an initial turbidity of about 60 ppm was mixed with 7 ppm of aluminum sulfate at the beginning of filtration, while 4–4.5 ppm of aluminum sulfate was added after 10 minutes, to produce filtered water of extremely stable turbidity. The resultant turbidity of the filtered water has a mean value of about 0.1 ppm, which value was hardly influenced by changes in the turbidity of the suspended water.

In addition, when 5 ppm of aluminum sulfate was added to the rinse water for rinsing the filter media, the filtration efficiency thereafter was remarkable. In particular, the turbidity of the filtered water was at a level of 0.5 ppm at the very beginning of filtration.

In the example of FIG. 3, the passage of time from the addition of aluminum sulfate to the arrival at the filter tank was less than 1 minute according to the process of the invention. The conventional process illustrated in FIG. 1 involves the addition of aluminum sulfate and the agitation for 15 to 20 minutes before introduction into the filtered tank for coagulating filtration according to well-known processes.

The reason why the suspended water can be clarified in the state in which existence of flocs cannot be recognized is that suspended particles run against the filter media such as sand, coal, synthetic resins and the like and adhere to them tightly. More precisely, aluminum ions used as a coagulant and so rapidly polymerized in an aqueous solution that polymerization is completely finished about 30 seconds after adding the coagulant to the raw water. It is supposed that the polycations of aluminum at the termination of polymerization adhere most easily and that they are converted gradually to aluminum hydroxide to weaken the adhesive strength. Accordingly, the position at which the coagulant is added is one of the important points of the present invention. In the invention, the suspended particles adhere to the filter media and are caught while the adhesive strength is so large that the filter media can hardly be cleaned merely by the usual water-washing. Therefore, for cleaning and regenerating, it is desirable to wash the filter media at first with the abundant air, as by stirring and then with water, and further to perform again air-washing and water-washing repeatedly.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A filtration process for clarification consisting essentially of the steps of adding an aluminum sulfate of about 3–5 ppm, an amount less than that with which formation of flocs can be recognized in a coagulation test, to suspended water having a turbidity of less than 100 ppm at a time not more than 1 minute before said suspended water is applied to a filter; filtering said suspended water at a filtration rate of 10–40 m/hr and, during said filtering, adding an additional quantity of about 3–5 ppm of said aluminum sulfate during the period after the beginning of filtration and continuing until the filtered water is stabilized.

2. A filtration process for clarification, consisting essentially of the steps of adding an aluminum sulfate of about 3–5 ppm, an amount less than that with which formation of flocs can be recognized in a coagulation test, to suspended water having a turbidity of less than 100 ppm at a time not more than 1 minute before applying said suspended water to a filter; filtering said suspended water through a filter media at a filtration rate of about 10–40 m/hr; and washing said filter media before said filtration with water containing about 5 ppm aluminum sulfate.

* * * * *